Oct. 7, 1924.
G. HEY ET AL
MULTIPLE DRILLING MACHINE
Filed April 4, 1923
1,511,164
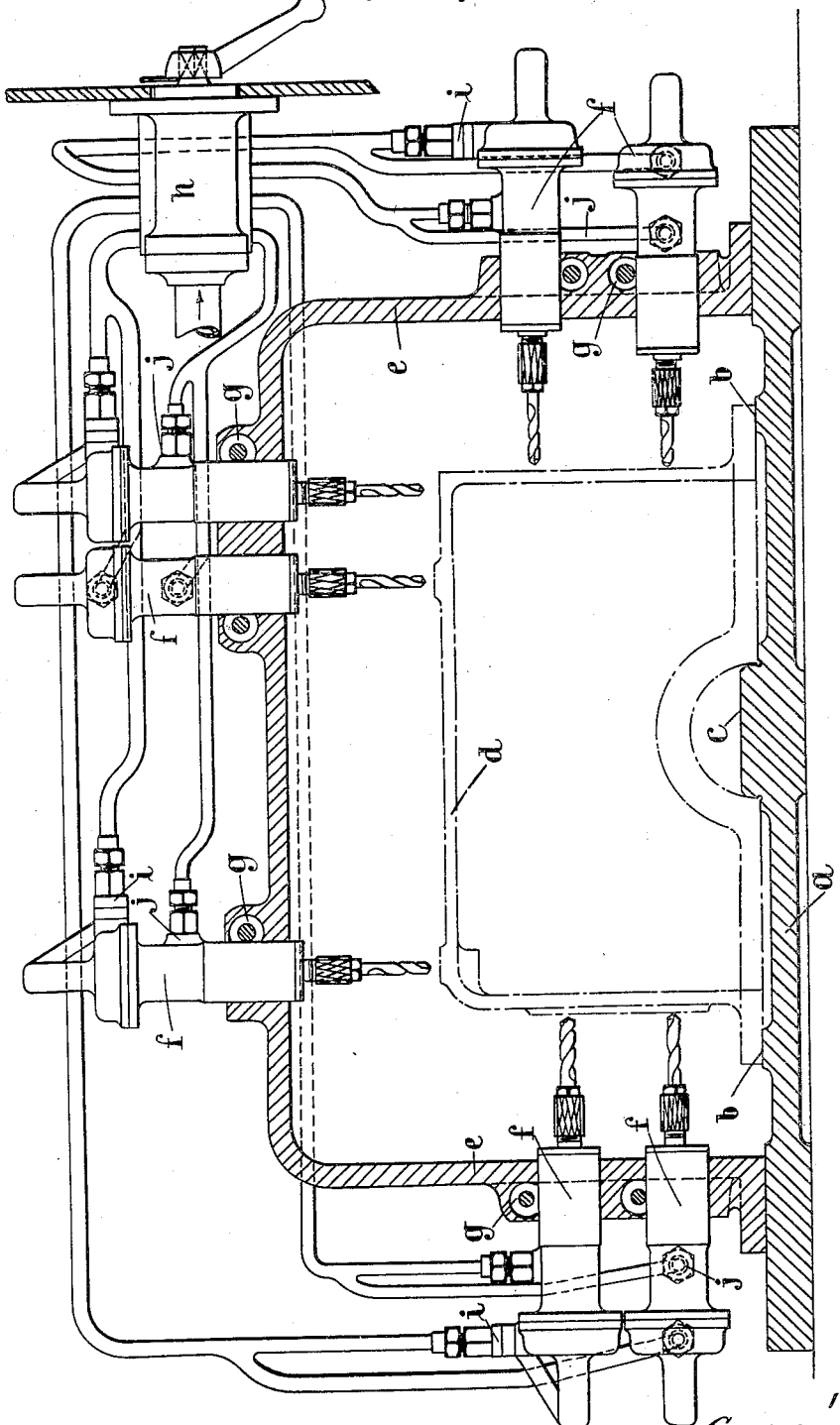
INVENTOR.
George Hey
Frederick George Natravers
By
James L. Norris
Attorney.

Patented Oct. 7, 1924.

1,511,164

UNITED STATES PATENT OFFICE.

GEORGE HEY, OF ST. MARGARETS-ON-THAMES, AND FREDERICK G. MATRAVERS, OF LUTON, ENGLAND.

MULTIPLE DRILLING MACHINE.

Application filed April 4, 1923. Serial No. 629,884.

*To all whom it may concern:*

Be it known that we, GEORGE HEY, a subject of the King of Great Britain, residing at St. Margarets-on-Thames, Middlesex, England, and FREDERICK GEORGE MATRAVERS, a subject of the King of Great Britain, residing at Luton, Bedfordshire, England, have invented new and useful Improvements in Multiple Drilling Machines, of which the following is a specification.

This invention relates to improvements in multiple drilling, grinding, reamering, countersinking, counterboring, facing, tapping, rivet spinning and swelling or like apparatus for standard jobs of a kind for which this apparatus is suitable, and especially to arrangements in which the motive power used for rotating the drills, grinders or like tools is also utilized for feeding and withdrawing them.

Our invention provides a machine in which a jig, fixture, or drill carrier frame is bolted over, upon, or otherwise securely held in relation to the part to be drilled, ground, or otherwise machined, as above indicated. The walls of this fixture are furnished with openings at the required places in which the drills, grinding or like tools are inserted and held by clamps or like fixing means. The drills, grinders or like tools are supplied with motive power from a common source, and are controlled by a common valve or switch. When compressed air or the like is used as the motive power, the exhaust may discharge into an exhaust chamber surrounding the fixture or direct into the air, or it may be directed on to the work to clear away the borings or grinding dust.

The accompanying drawing shows, diagrammatically, partly in section, a multitple drill holder and work holder constructed in accordance with this invention.

As shown in this drawing, $a$ is a bedplate provided with ridges $b$, $b$ and a boss $c$ for supporting and positioning an article $d$ to be drilled. If necessary, the article $d$ may be held in the required position by bolts, dog clips or other convenient holding means, not shown. The bed plate $a$ also supports a frame $e$ in which drills $f$ are mounted in apertures provided in the frame for this purpose, the drills being held in the apertures by suitable clamping devices indicated at $g$. The drills are of a type in which the drill chuck is rotated, advanced and retracted by suitable means comprised in the drill which thus constitutes a self-contained unit movable from place to place. As shown the drills $f$ are of a type operated by compressed air supplied to the drills under the control of a multiple-way cock $h$. Each drill has a connection $i$ supplying motive power to the means for rotating the drill chuck, and a connection $j$ supplying motive power to the means for advancing or retracting the chuck.

With this arrangement all the drill chucks can be set simultaneously in rotation by moving the cock $h$ to one position of adjustment, simultaneously advanced and simultaneously retracted by further adjustment of the cock, the rotation being continued or stopped, as desired and in accordance with the disposition of the ports within the controlling cock $h$.

We claim:—

1. In a multiple drilling machine, a bed plate, a drill supporting frame having a plurality of apertures, a plurality of self-contained drill units each mounted in one of said apertures, each of said apertures having a clamping and positioning device associated therewith for adjustably clamping and positioning the drill unit contained therein separately from the drill units contained in the other apertures.

2. In a multiple drilling machine, a bed plate, a drill supporting frame having a plurality of apertures, a plurality of self-contained drill units, each drilling unit arranged separately in one of said apertures, each of said apertures having a clamping and positioning device associated therewith for adjustably clamping and positioning the drill unit contained therein, and a plurality of conduits leading respectively to said drill units for supplying compressed fluid to each drill unit to rotate, advance, and retract such drill.

3. In a multiple drilling machine, a bed plate, a drill supporting frame having a plurality of apertures, a plurality of self-contained drilling units each mounted in one of said apertures, each of said apertures having a clamping and positioning device associated therewith for adjustably clamping and positioning the drill unit contained therein separately from the drill units contained in the other apertures, a plurality of conduits leading respectively to said drill units for supplying compressed fluid to each drill unit to rotate, advance and retract such drill, and a valve common to all of said conduits for controlling the supply of compressed fluid.

4. In a multiple drilling machine, a bed plate, a drill supporting frame having a plurality of apertures, a plurality of self-contained drill units each mounted in one of said apertures, each of said apertures having a clamping and positioning device associated therewith for adjustably clamping and positioning the drill unit contained therein independently of the drill units contained in the other apertures, a plurality of conduits leading respectively to said drill units for supplying compressed fluid to said drill units to rotate, advance and retract the drills, a valve common to all of said drill units for controlling the supply of compressed fluid thereto, and means for exhausting the compressed fluid from each unit upon the work under treatment.

5. In a multiple drilling machine, a bed plate, a drill supporting frame having a plurality of apertures, a plurality of self-contained drill units each mounted in one of said apertures, each of said apertures having a clamping and positioning device associated therewith for independently and adjustably securing said drill units in said apertures, a plurality of conduits leading respectively to said drill units for supplying compressed fluid to each unit for rotating the drill, a plurality of separate conduits leading respectively to said drill units for supplying compressed fluid to each drilling unit to advance and retract the drills contained therein, a valve common to all of said conduits controlling the flow of compressed fluid therethrough, and means for exhausting the compressed fluid from each drill unit upon the parts of the work under treatment.

GEORGE HEY.
F. G. MATRAVERS.

Witnesses:
GEORGE HARRISON,
CHAS. F. MURPHY.